(12) United States Patent
Chiu et al.

(10) Patent No.: US 7,848,567 B2
(45) Date of Patent: *Dec. 7, 2010

(54) DETERMINING REGIONS OF INTEREST IN SYNTHETIC IMAGES

(75) Inventors: Patrick Chiu, Menlo Park, CA (US); Qiong Liu, Milpitas, CA (US); Andreas Girgensohn, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1001 days.

This patent is subject to a terminal disclaimer.

(21) Appl. No.: 10/948,823

(22) Filed: Sep. 23, 2004

(65) Prior Publication Data

US 2006/0062456 A1 Mar. 23, 2006

(51) Int. Cl.
- G06K 9/00 (2006.01)
- G06K 9/34 (2006.01)
- G06K 9/66 (2006.01)
- G06K 15/00 (2006.01)
- H04N 1/46 (2006.01)

(52) U.S. Cl. ............ 382/164; 382/165; 382/171; 382/173; 382/190; 382/191; 358/2.1; 358/538

(58) Field of Classification Search ............ 382/162, 382/164, 165, 173, 175, 180, 190–191; 358/2.1, 358/453, 538
See application file for complete search history.

(56) References Cited

U.S. PATENT DOCUMENTS

| | | | |
|---|---|---|---|
| 5,048,109 A | 9/1991 | Bloomberg | |
| 5,224,176 A * | 6/1993 | Crain | 382/136 |
| 5,341,439 A | 8/1994 | Hsu | |
| 5,537,491 A | 7/1996 | Mahoney | |
| 5,751,844 A * | 5/1998 | Bolin et al. | 382/156 |
| 5,761,338 A | 6/1998 | Kasamatsu | |
| 5,995,668 A * | 11/1999 | Corset et al. | 382/233 |
| 6,081,615 A | 6/2000 | Yasui | |
| 6,222,932 B1 * | 4/2001 | Rao et al. | 382/100 |
| 6,246,790 B1 * | 6/2001 | Huang et al. | 382/162 |

(Continued)

OTHER PUBLICATIONS

J. Huang, S. R. Kumar, M. Mitra, W.-J. Zhu, and R. Zabih. Image indexing using color correlograms. In Proc. IEEE Comp. Soc. Conf. Comp. Vis. and Patt. Rec., pp. 762-768, 1997.*

(Continued)

*Primary Examiner*—Wenpeng Chen
*Assistant Examiner*—Gandhi Thirugnanam
(74) *Attorney, Agent, or Firm*—Fliesler Meyer LLP

(57) ABSTRACT

An algorithm for finding regions of interest (ROI) in synthetic images based on an information driven approach in which sub-blocks of a set of synthetic image are analyzed for information content or compressibility based on textural and color features. A DCT may be used to analyze the textural features of a set of images and a color histogram may be used to analyze the color features of the set of images. Sub-blocks of low compressibility are grouped into ROIs using a type of morphological technique. Unlike other algorithms that are geared for highly specific types of ROI (e.g. OCR text detection), the method of the present invention is generally applicable to arbitrary synthetic images. The present invention can be used with several other image applications, including Stained-Glass collages presentations.

22 Claims, 13 Drawing Sheets

U.S. PATENT DOCUMENTS

| | | | |
|---|---|---|---|
| 6,275,614 B1* | 8/2001 | Krishnamurthy et al. | 382/224 |
| 6,292,575 B1 | 9/2001 | Bortolussi | |
| 6,415,046 B1 | 7/2002 | Kerut, Sr. | |
| 6,430,312 B1* | 8/2002 | Huang et al. | 382/165 |
| 6,542,637 B1* | 4/2003 | Kita | 382/195 |
| 6,584,221 B1* | 6/2003 | Moghaddam et al. | 382/165 |
| 6,674,905 B1* | 1/2004 | Matsugu et al. | 382/199 |
| 6,731,789 B1* | 5/2004 | Tojo | 382/162 |
| 6,819,793 B1* | 11/2004 | Reshetov et al. | 382/166 |
| 6,819,795 B1* | 11/2004 | Chiu et al. | 382/173 |
| 6,922,485 B2 | 7/2005 | Hirata | |
| 6,965,706 B2* | 11/2005 | Qian et al. | 382/305 |
| 7,043,094 B2 | 5/2006 | Thomas | |
| 7,110,007 B2* | 9/2006 | Odagawa | 345/634 |
| 7,239,743 B2* | 7/2007 | Gardella et al. | 382/166 |
| 7,263,220 B2* | 8/2007 | Crandall et al. | 382/165 |
| 7,295,700 B2* | 11/2007 | Schiller et al. | 382/159 |
| 7,724,959 B2* | 5/2010 | Chiu et al. | 382/190 |
| 2001/0020981 A1* | 9/2001 | Jun et al. | 348/426.1 |
| 2001/0040980 A1* | 11/2001 | Yamaguchi | 382/100 |
| 2002/0031247 A1* | 3/2002 | Matsuura et al. | 382/132 |
| 2002/0076100 A1* | 6/2002 | Luo | 382/164 |
| 2002/0085243 A1* | 7/2002 | Kanatsu | 358/453 |
| 2002/0191864 A1* | 12/2002 | Lennon et al. | 382/288 |
| 2003/0044061 A1* | 3/2003 | Prempraneerach et al. | 382/164 |
| 2003/0053686 A1* | 3/2003 | Luo et al. | 382/165 |
| 2003/0081848 A1* | 5/2003 | Wada | 382/240 |
| 2003/0099397 A1* | 5/2003 | Matsugu et al. | 382/173 |
| 2003/0108237 A1* | 6/2003 | Hirata | 382/164 |
| 2003/0118214 A1 | 6/2003 | Porikli | |
| 2003/0179942 A1* | 9/2003 | Okada et al. | 382/240 |
| 2004/0042659 A1* | 3/2004 | Guo et al. | 382/176 |
| 2004/0151372 A1* | 8/2004 | Reshetov et al. | 382/166 |
| 2005/0084154 A1* | 4/2005 | Li et al. | 382/190 |
| 2006/0015495 A1* | 1/2006 | Keating et al. | 707/6 |
| 2006/0126932 A1* | 6/2006 | Eschbach | 382/173 |
| 2006/0204082 A1* | 9/2006 | Boregowda et al. | 382/162 |

OTHER PUBLICATIONS

J. R. Smith, Shih-Fu Chang. Local Color and texture extraction and spatial query. In. Proc. Image Processing vol. 3., p. 1011-1014, Sep. 16-19, 1996.*

Manjunath, B.S.; Ohm, J.-R.; Vasudevan, V.V.; Yamada, A.; Color and Texture Descriptors. Circuits and Systems for Video Technology, IEEE Transactions on, vol. 11 Issue 6, pp. 703-715, Jun. 2001.*

B. S. Manjunath, W. -Y. Ma, "Texture Features for Browsing and Retrieval of Image Data", IEEE Trans on PAMI, vol. 18, No. 8, pp. 837-842, 1996.*

H. Yu, M. Li, H.-J. Zhang, and J. Feng. Color texture moments for content-based image retrieval. In International Conference on Image Processing, pp. 24 28. 2002.*

F. Zhou, J. Feng, Q. Shi, "Image Segmentation Based on Local Fourier Coefficients Histogram", Proc. SPIE—2nd Int. Conf. on Multispectral Image Processing and Pattern Recognition, Wuhan, China, Nov. 2001.*

Chiu, P., Girgensohn, A., Polak, Wolf, Rieffel, E., Wilcox, L., Bennett III, F., A Genetic Segmentation Algorithm for Image Data Streams and Video, Proceedings of the Genetic and Evolutionary Computation Conference (GECCO), Las Vegas, NV, 2000.

Boreczky, John, et al., "An Interactive Comic Book Presentation for Exploring Video," *Proc. CHI '00*, ACM Press, pp. 185-192 (2000).

Cai, Deng, et al., "Hierarchical Clustering of WWW Image Search Results Using Visual, Textual and Link Information," *Proc. of ACM Multimedia '04*, pp. 952-959 (2004).

Chen, Francine, et al., "Multi-Modal Browsing of Images in Web Documents," *Proc. of SPIE Document Recognition and Retrieval VI* (1999).

Chiu, Patrick, et al., "Stained-Glass Visualization for Highly Condensed Video Summaries," *Proc. IEEE Intl. Conf. on Multimedia and Expo (ICME '04)* (2004).

Girgensohn, Andreas, et al., "Stained Glass Photo Collages," *UIST '04 Poster*, pp. 13-14 (2004).

Ide, Nancy, et al., "Word Sense Disambiguation: The State of the Art," *Computational Linguistics*, 24(1), pp. 1-40, 1998.

Kerne, Andruid, "*CollageMachine: A Model of 'Interface Ecology,*'" NYU Ph.D. Dissertation (2001).

Li, Zhi-Wei, et al., "Intuitive and Effective Interfaces for WWW Image Search Engines", *ACM Multimedia '04 Demo*, 2004.

Ma, Yu-Fei, et al., "Contrast-based Image Attention Analysis by Using Fuzzy Growing," *Proc. of ACM Multimedia '03*, pp. 374-381.

Mukherjea, Sougata, et al., "Using Clustering and Visualization for Refining the Results of a WWW Image Search Engine", *Proc. 1998 Workshop on New paradigms in Information Visualization and Manipulation*, ACM Press, pp. 29-35 (1998).

Suh, Bongwon, et al., "Automatic Thumbnail Cropping and Its Effectiveness," *Proceedings of UIST '03*, pp. 95-104 (2003).

Wang, Xin-Jing, et al., "Multi-Model Similarity Propagation and Its Application for Web Image Retrieval," *Proc. of ACM Multimedia '04*, pp. 944-951 (2004).

Wang, Xin-Jing, et al., "Grouping Web Image Search Result," *ACM Multimedia '04 Poster* (Oct. 10-16, 2004), pp. 436-439 (2004).

Wang, Ming-Yu, et al., "MobiPicture—Browsing Pictures on Mobile Devices," *ACM Multimedia '04 Demo* (Nov. 2-8, 2003), pp. 106-107 (2003).

Christel, M., et al., "Multimedia Abstractions for a Digital Video Library," Proceedings of ACM Digital Libraries '97 International Conference, pp. 21-29, Jul. 1997.

Elliott, E.L., "Watch-Grab-Arrange-See: Thinking with Motion Images via Streams and Collages," MIT MS Visual Studies Thesis, Feb. 1993.

Peyrard, N., et al., "Motion-Based Selection of Relevant Video Segments for Video Summarisation," Proc. Intl. Conf. on Multimedia and Expo (ICME 2003), pp. 409-412, 2003.

Uchihashi, S., et al., "Video Manga: Generating semantically meaningful video summaries," Proceedings ACM Multimedia '99, pp. 383-392, 1999.

Yeung, M., et al., "Video Visualization for Compact Presentation and Fast Browsing of Pictorial Content," IEEE Transactions on Circuits and Systems for Video Technology, vol. 7, No. 5, pp. 771-785, Oct. 1997.

* cited by examiner

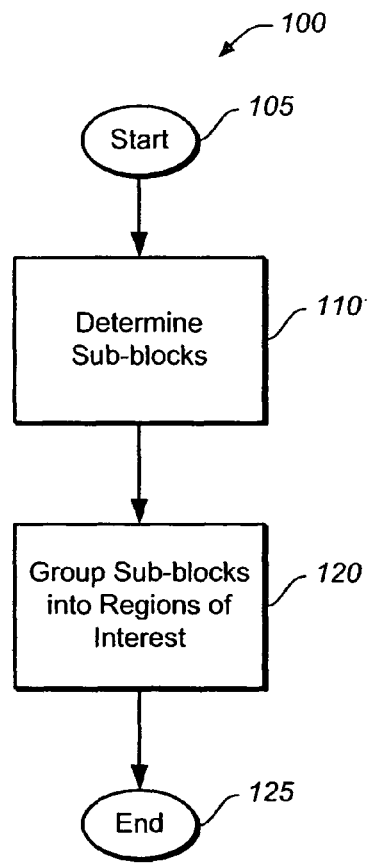
FIG._1
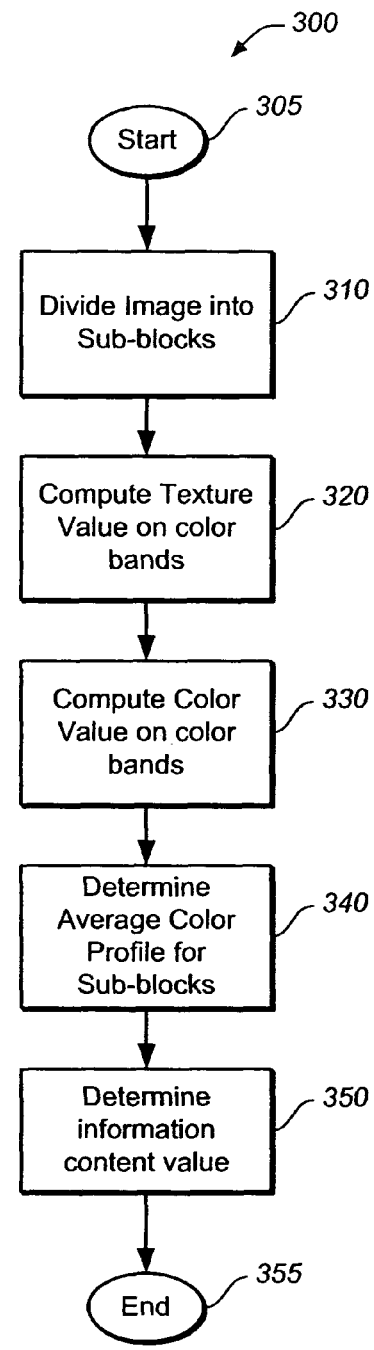
FIG._3

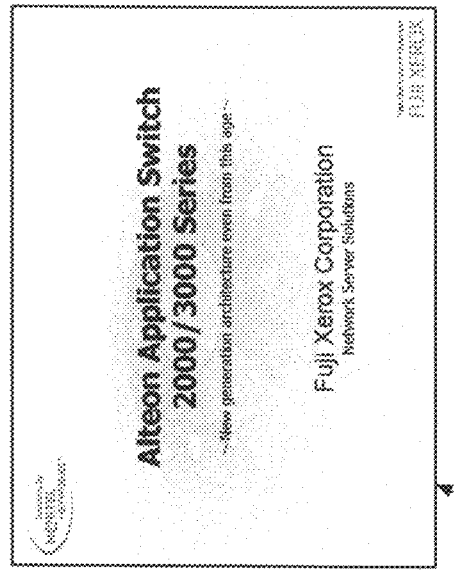
*FIG._2A*
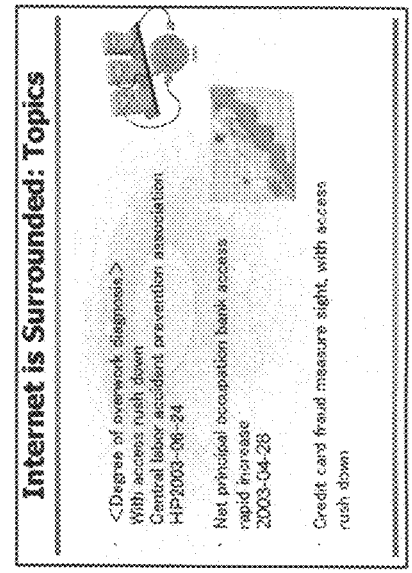
*FIG._2C*
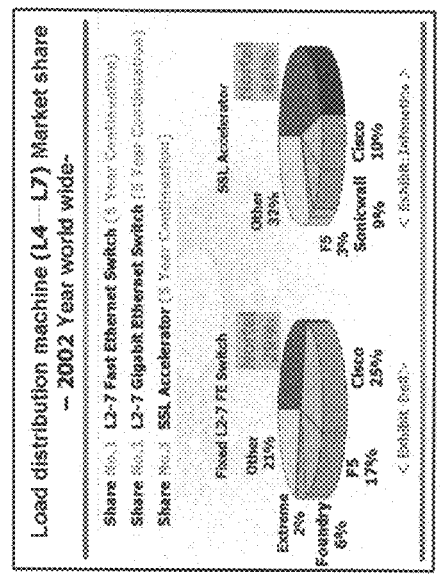
*FIG._2B*
*FIG._2*
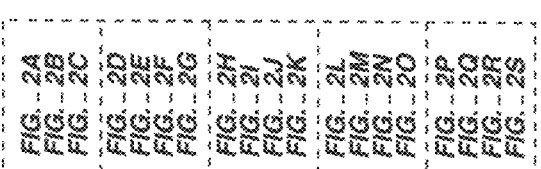

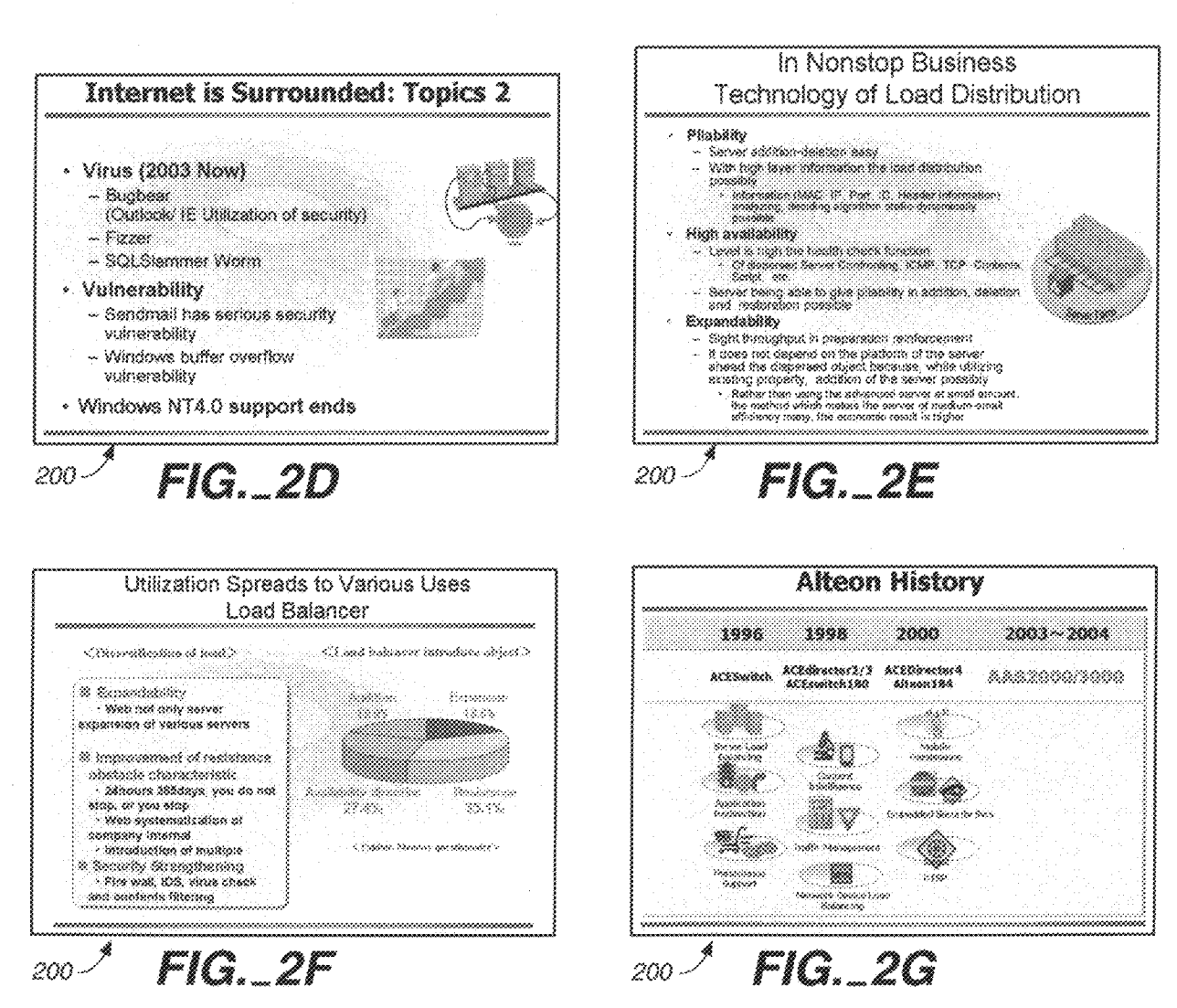

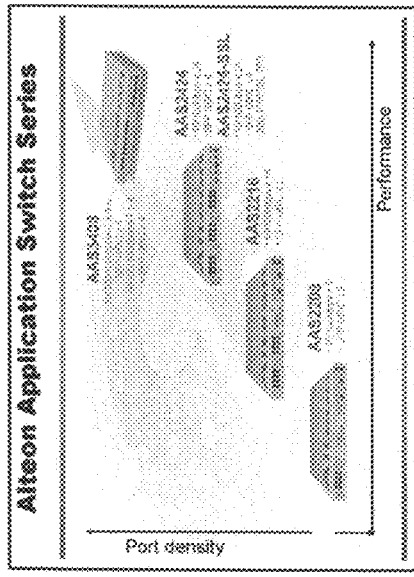
FIG._2I
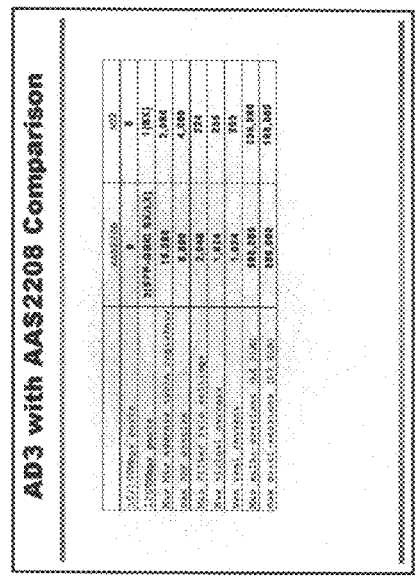
FIG._2K
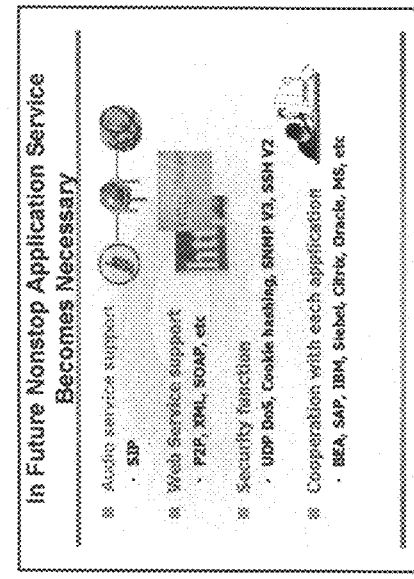
FIG._2H
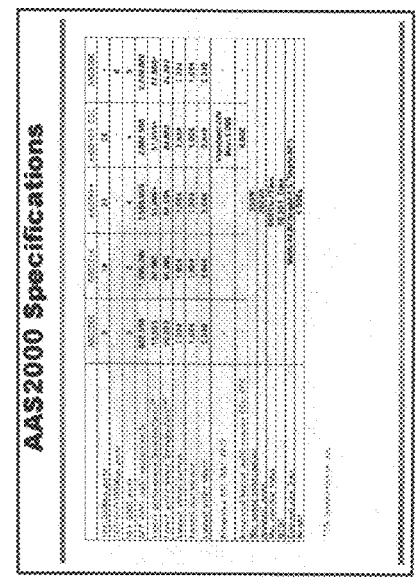
FIG._2J

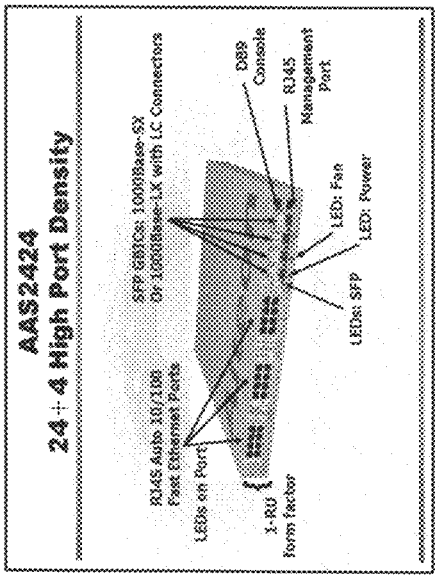
FIG._2L
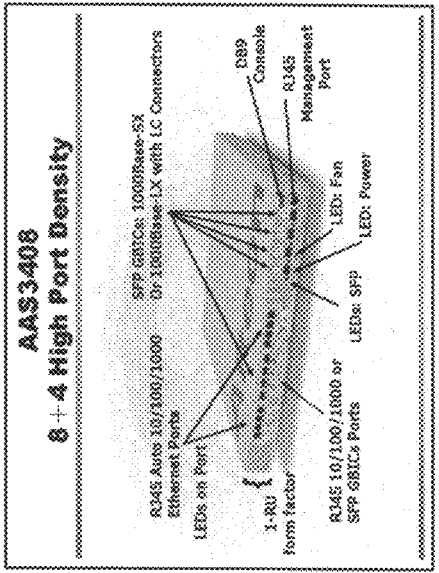
FIG._2M
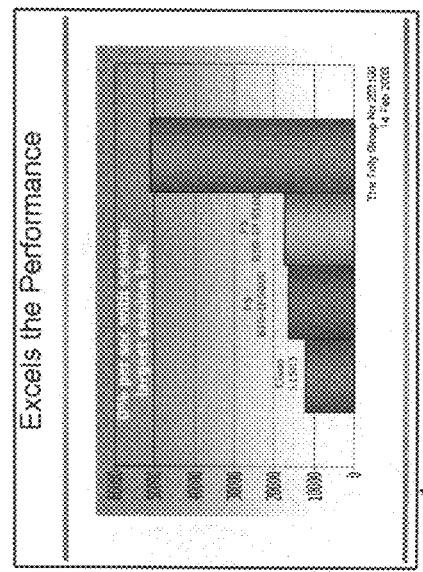
FIG._2N
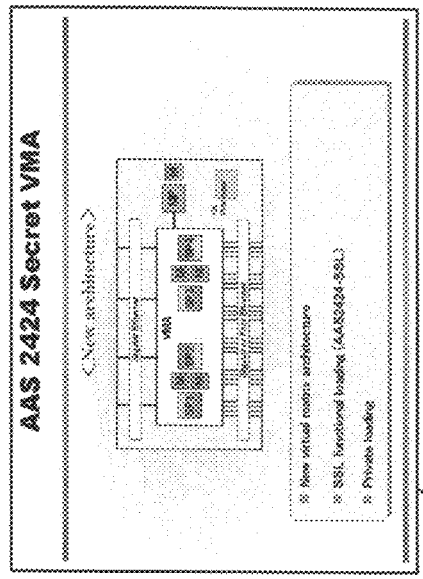
FIG._2O

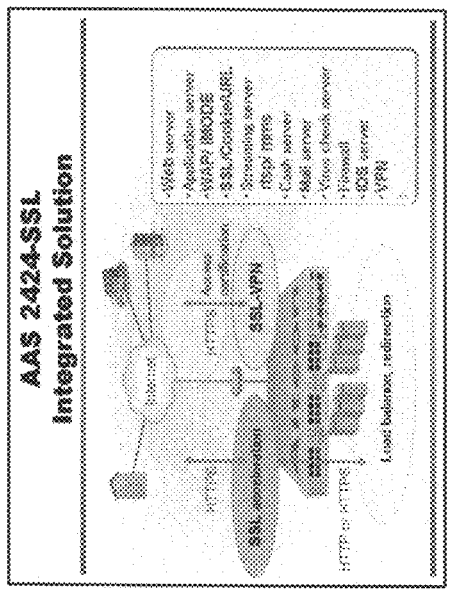
FIG._2P
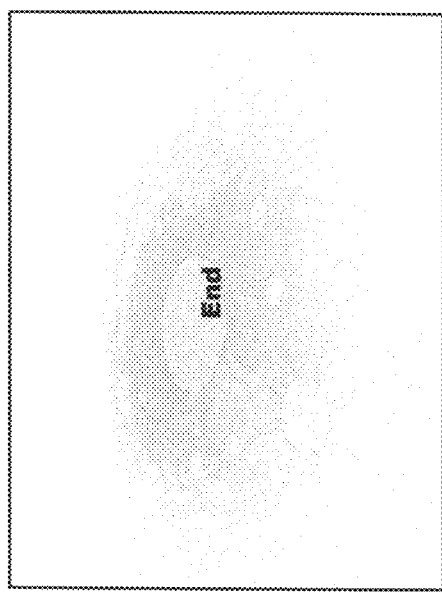
FIG._2Q
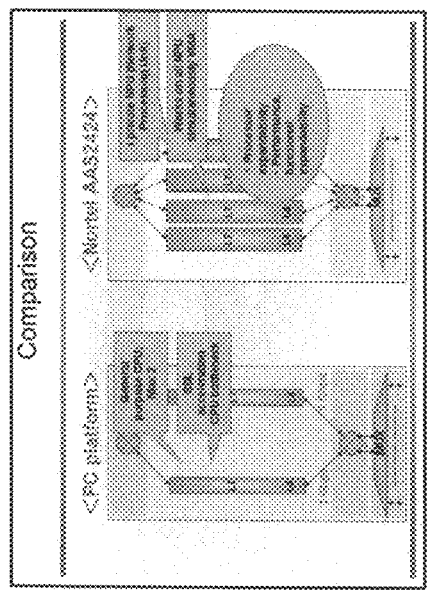
FIG._2R
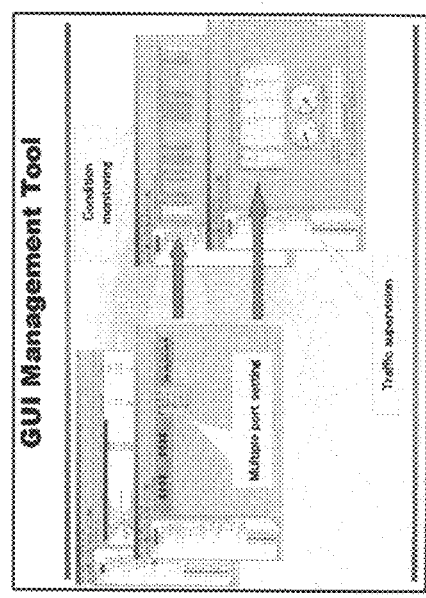
FIG._2S

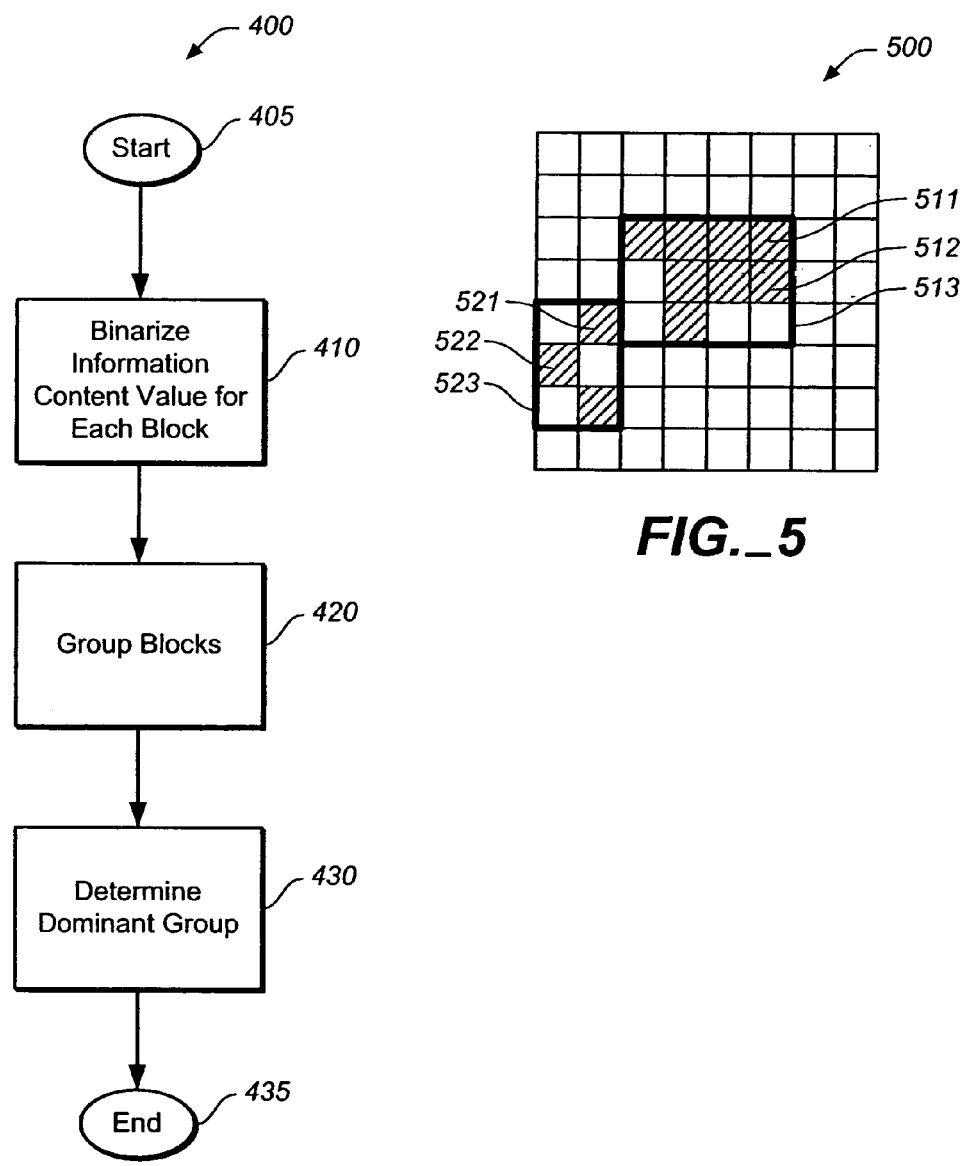

| FIG._6A | FIG._6D | FIG._6H | FIG._6L | FIG._6P |
| FIG._6B | FIG._6E | FIG._6I | FIG._6M | FIG._6Q |
| FIG._6C | FIG._6F | FIG._6J | FIG._6N | FIG._6R |
|         | FIG._6G | FIG._6K | FIG._6O | FIG._6S |

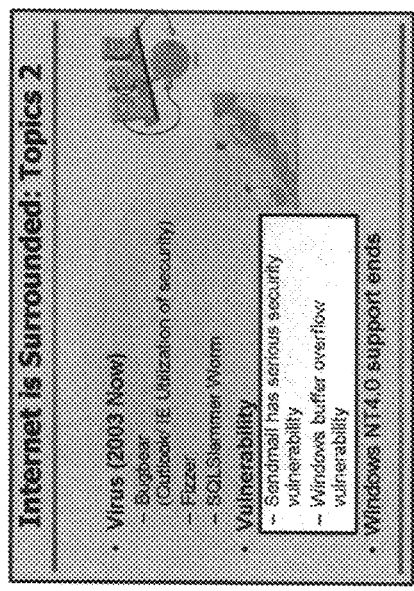
FIG._6D
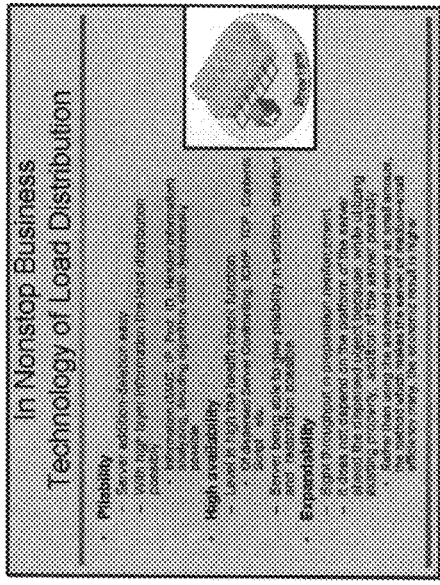
FIG._6E
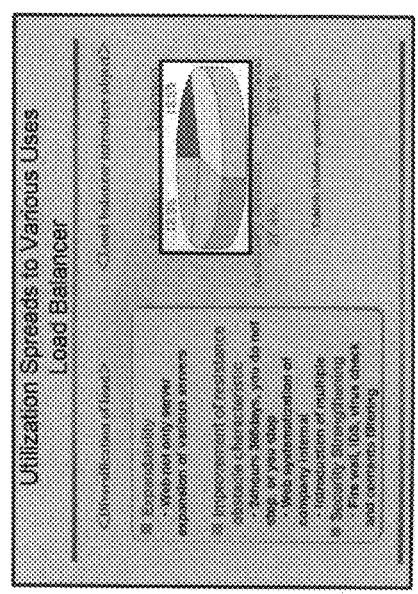
FIG._6F
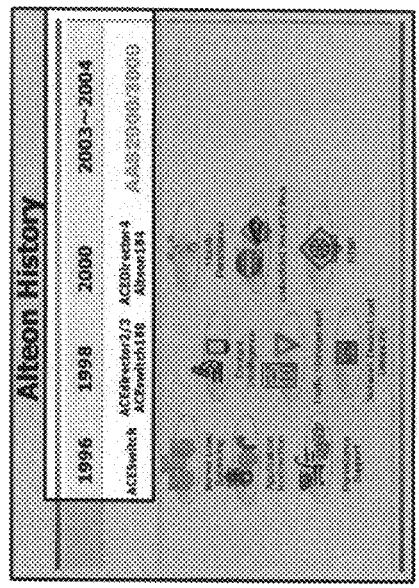
FIG._6G

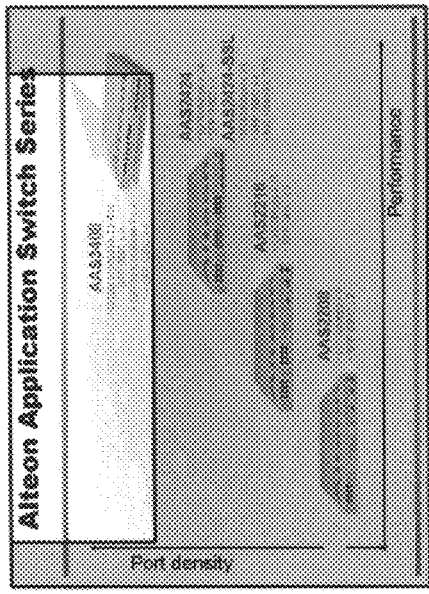
FIG._6I
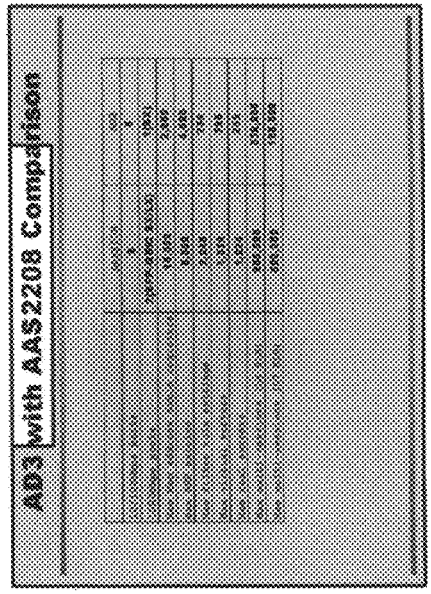
FIG._6K
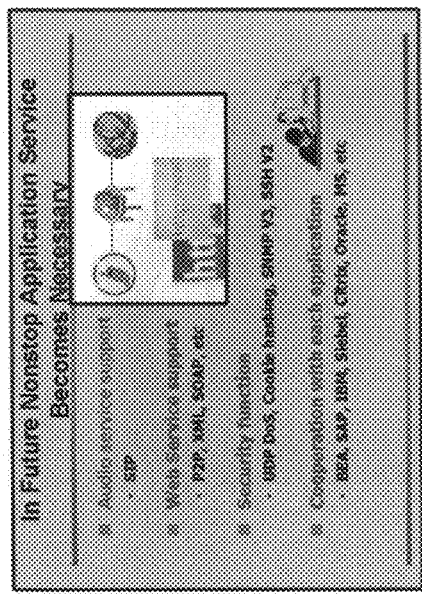
FIG._6H
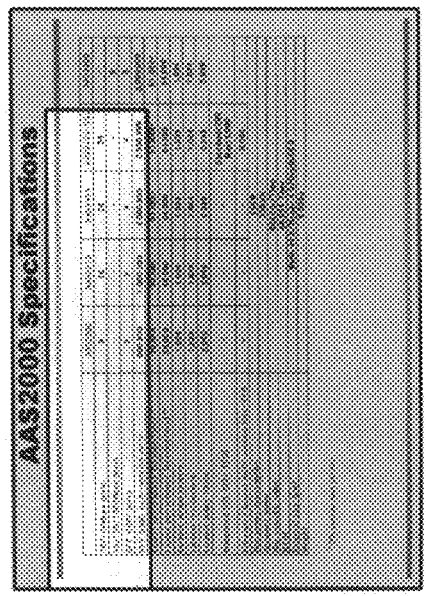
FIG._6J

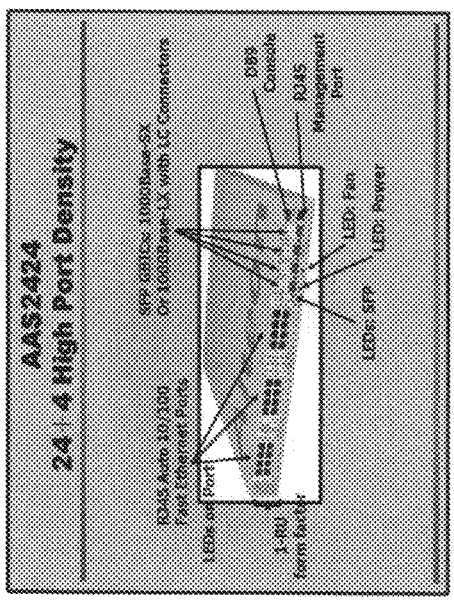
FIG._6L
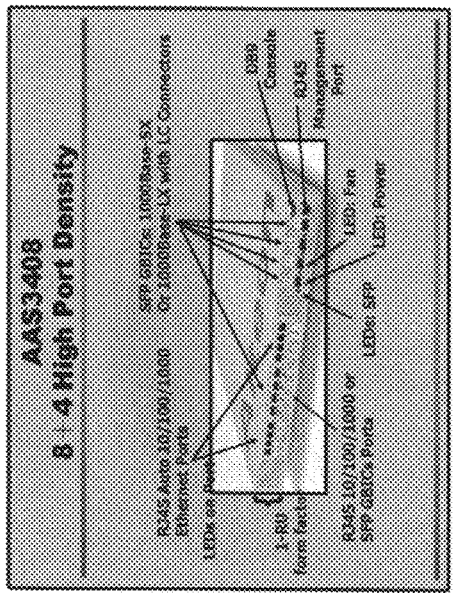
FIG._6M
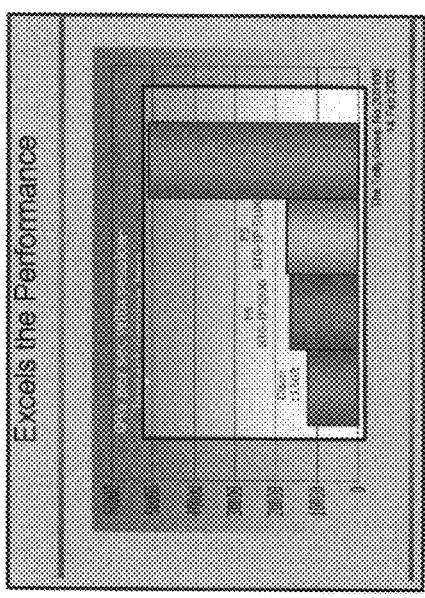
FIG._6N
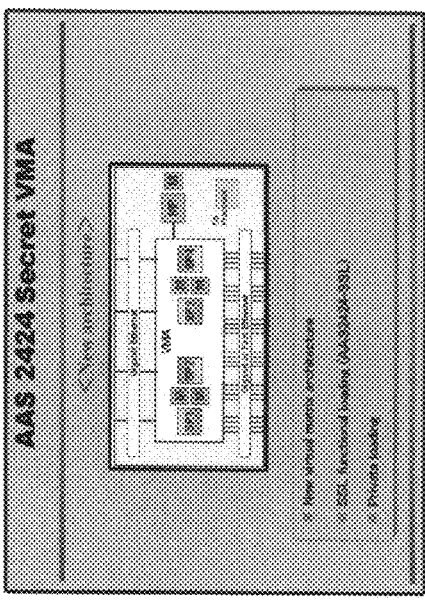
FIG._6O

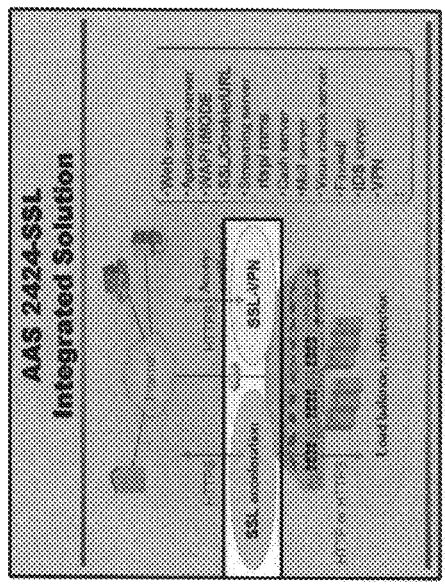
FIG._6Q
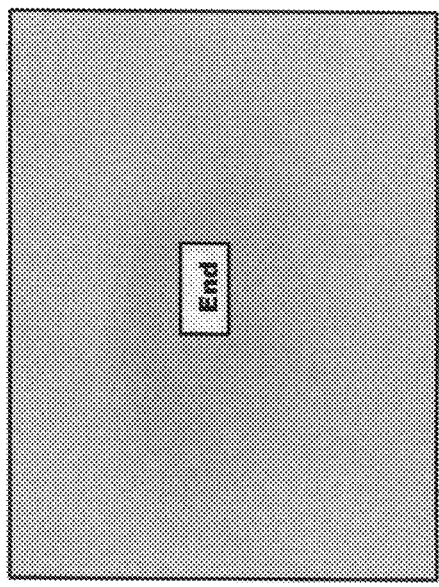
FIG._6S
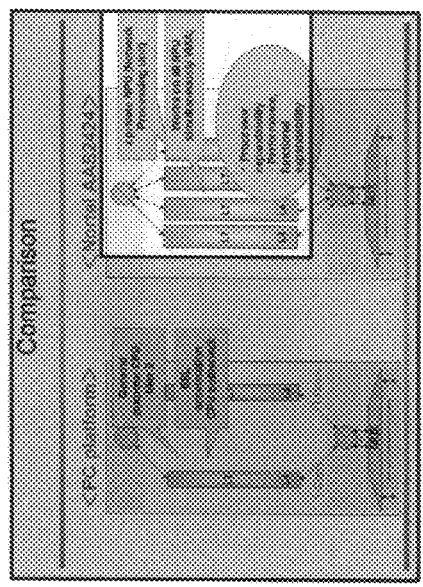
FIG._6P
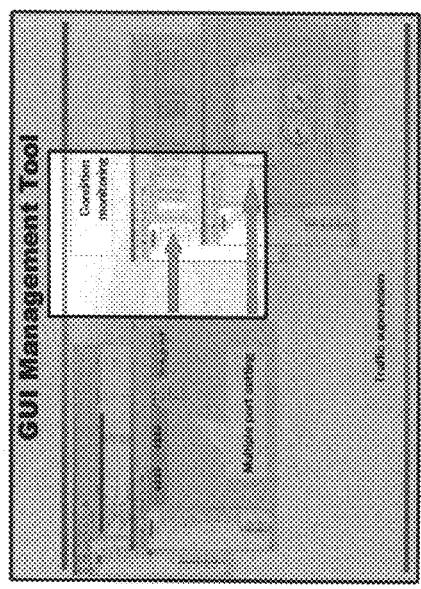
FIG._6R

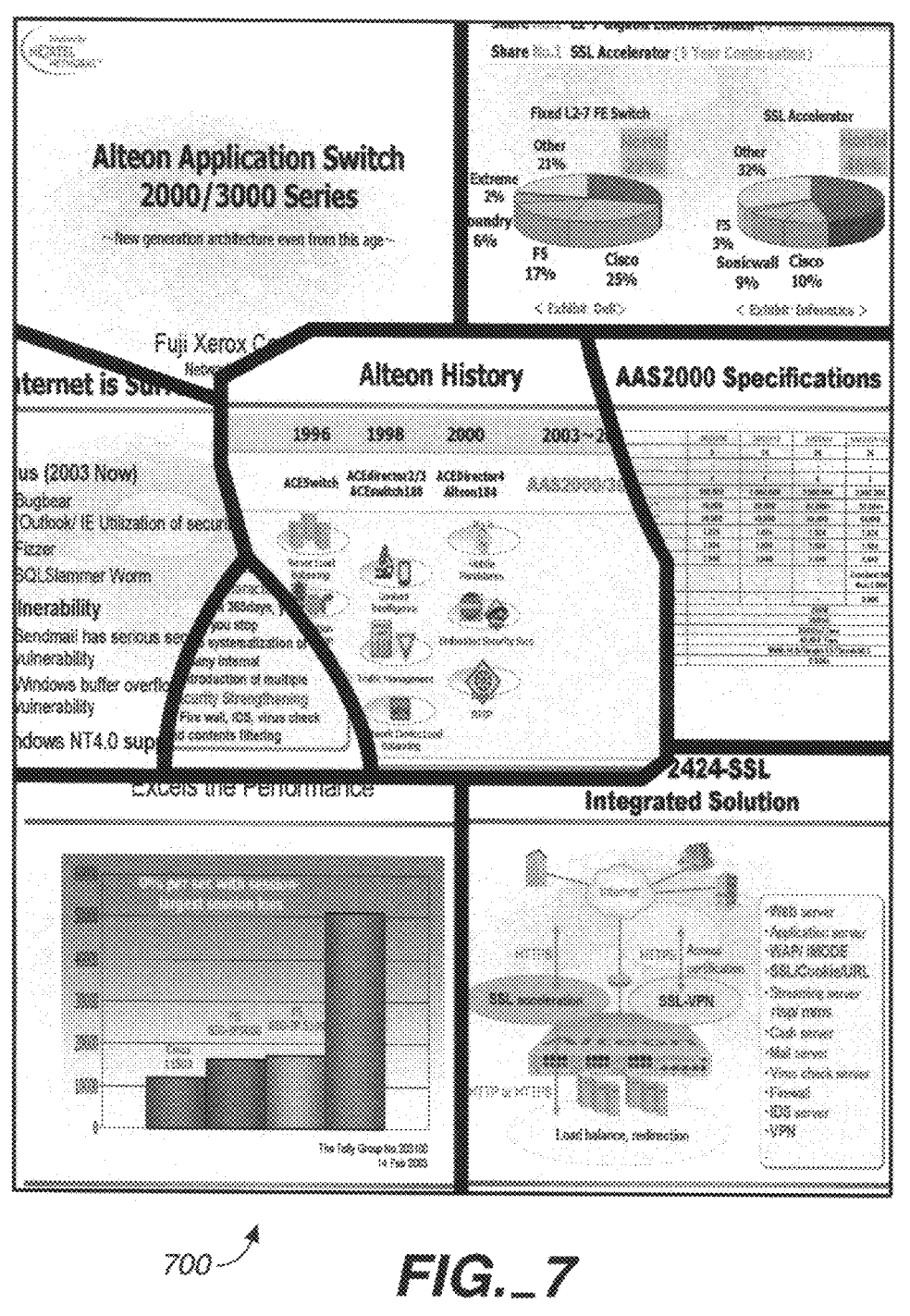

FIG._7

DETERMINING REGIONS OF INTEREST IN SYNTHETIC IMAGES

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/948,730, entitled "DETERMINING REGIONS OF INTEREST IN PHOTOGRAPHS AND IMAGES", filed on Sep. 23, 2004, which issued as U.S. Pat. No. 7,724,959 on May 25, 2010.

U.S. patent application Ser. No. 10/815,389, entitled "EXTRACTING VIDEO REGIONS OF INTEREST", filed on Mar. 31, 2004, which issued as U.S. Pat. No. 7,639,839 on Dec. 29, 2009; and U.S. patent application Ser. No. 10/815,354, entitled "GENERATING A HIGHLY CONDENSED VISUAL SUMMARY", filed on Mar. 31, 2004, which issued as U.S. Pat. No. 7,697,785 on Apr. 13, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The current invention relates generally to digital image processing, and more particularly to finding regions of interest in synthetic images.

2. Description of Related Art

Slide presentations have become a popular manner for making presentations since the development of PowerPoint® and other presentation software packages. Slides can be easily generated with colorful backgrounds and graphics to convey information. An important challenge is figuring out ways to manage and visualize collections of slides and their content. Another challenge is viewing presentation content on small displays and mobile devices where the content must be condensed to efficiently and effectively be displayed on smaller screens.

In U.S. patent application Ser. No. 10/815,389, entitled "EXTRACTING VIDEO REGIONS OF INTEREST" and U.S. patent application Ser. No. 10/815,354, entitled "GENERATING A HIGHLY CONDENSED VISUAL SUMMARY", a method was disclosed to summarize and condense a video using a Stained-Glass Visualization, which shows a video using a storyboard generated from regions of interest (ROI) in the key frames of the highly ranked video segments. The ROIs are laid out and the gaps are filled by extending the ROIs using a Voronoi technique. This produces irregular boundaries and the result looks like a stained glass. Along with the visualization method, an algorithm was provided for finding the ROIs in a video segment based on motion analysis.

The Stained-Glass visualization is applicable to photos and images, producing a collage from a given set of images. Stained-Glass type collages can be used in many ways. For example, a wallet-sized collage of family members can be displayed on a PDA or cell phone, larger collages of a party can be put on a Web page and shared with friends, and poster sized collages of scenic photos from a vacation can be printed and framed. Additionally, summarizations of a number of images may be presented in a tightly fit manner.

The earlier algorithm for finding ROIs in videos, being based on motion analysis, does not work for synthetic images such as a series of slides. Additionally, a set of slides has distinctive color and textural background and foreground features that traditional image processing methods do not address. What is needed is a method for finding ROIs in synthetic images such that collections of images can be managed and visualized and presented on displays.

SUMMARY OF THE INVENTION

In one embodiment, the present invention includes an algorithm for finding regions of interest (ROI) in synthetic images based on an information driven approach in which sub-blocks of a set of synthetic image are analyzed for information content or compressibility based on textural and color features. In one embodiment, a DCT is used to analyze the textural features of a set of images and a color histogram is used to analyze the color features of the set of images. Sub-blocks of low compressibility are grouped into ROIs using a type of morphological technique. Unlike other algorithms that are geared for highly specific types of ROI (e.g. OCR text detection), the method of the present invention is generally applicable to arbitrary synthetic images. The present invention can be used with several other image applications, including Stained-Glass collages presentations.

BRIEF DESCRIPTION OF THE DRAWINGS

Preferred embodiment(s) of the present invention will be described in detail based on the following figures, wherein:

FIG. 1 is an illustration of a method for determining regions of interest in synthetic images in accordance with one embodiment of the present invention;

FIG. 2 is an illustration of a set of synthetic images in accordance with one embodiment of the present invention;

FIG. 3 is an illustration of a method for determining sub-blocks in an image in accordance with one embodiment of the present invention;

FIG. 4 is an illustration of a method for grouping sub-blocks into regions of interest in accordance with one embodiment of the present invention;

FIG. 5 is an illustration of binarized sub-blocks for an image in accordance with one embodiment of the present invention;

FIG. 6 is an illustration of a set of synthetic images and their corresponding region of interest in accordance with one embodiment of the present invention; and FIG. 7 is an illustration of a collage of synthetic images in accordance with one embodiment of the present invention.

DETAILED DESCRIPTION

In one embodiment, the present invention includes an algorithm for finding regions of interest (ROI) in synthetic images based on an information driven approach in which sub-blocks of a set of synthetic image are analyzed for information content or compressibility based on textural and color features. In one embodiment, a DCT is used to analyze the textural features of a set of images and a color histogram is used to analyze the color features of the set of images. Sub-blocks of low compressibility are grouped into ROIs using a type of morphological technique. Unlike other algorithms that are geared for highly specific types of ROI (e.g. OCR text detection), the method of the present invention is generally applicable to arbitrary synthetic images. The present invention can be used with several other image applications, including Stained-Glass collages presentations.

FIG. 1 is an illustration of a method 100 for finding regions of interest in synthetic images in accordance with one embodiment of the present invention. Method 100 begins with start step 105. Sub-blocks within an image are then determined at step 110. After the sub-blocks within an image are determined, the sub-blocks are grouped into ROIs at step 120. These steps are discussed in more detail below. Operation of method 100 then ends at step 125.

The synthetic images from which the ROIs are determined may include a set of slides. FIG. 2 illustrates a set of slides 200 for which regions of interest may be determined.

Determining Sub-Blocks in a Synthetic Image

In one embodiment, determining sub-blocks of a synthetic image involves determining sub-blocks having high information content. FIG. 3 is an illustration of a method 300 for finding sub-blocks of high information in accordance with one embodiment of the present invention. Method 300 begins with start step 305. Next, the synthetic image is divided into sub-blocks at step 310. The actual size of the sub-blocks may vary according to the processing power of the system and the desired detail of the results. In another embodiment, the original size of an image may be scaled to a desired size from which sub-blocks can be taken. For example, images may be scaled to 128 x 128 pixels, from which sixty-four sub-blocks of 16 x 16 can be partitioned.

After the sub-blocks have been determined, the texture features of the image are analyzed and quantized for one or more of the color bands of the image at step 320. The texture value may be associated with the spectral features for sub-blocks of an image and may be computed on at least one of the color bands for each of the sub-blocks. In one embodiment, computing the texture value may include computing a two-dimensional discrete cosine transforms (DCT) on color bands within each sub-block. In one embodiment, a DCT is performed in all three color bands in RGB space (red, green and blue bands). Performing a DCT on all three color bands is better than performing a single DCT on a single luminance band because the color information usually helps to make objects more salient.

The two dimensional DCT is defined by:

$$F[u,v] = C[u]C[v]\sqrt{\frac{2}{M}}\sqrt{\frac{2}{N}}\sum_{m=0}^{M-1}\sum_{n=0}^{N-1} f[m,n]\cos\left(\frac{(2m+1)u\pi}{2M}\right)\cos\left(\frac{(2n+1)v\pi}{2N}\right) \quad (1)$$

for u=0, 1, 2, . . . , M−1 and v=0,1,2 , . . . , N−1.

$$C[k] = \begin{cases} 1/\sqrt{2} & \text{for } k=0 \\ 1 & \text{else} \end{cases}$$

In addition, for each color band, f[m, n] is the color value at the pixel [m, n].

After the texture value has been determined on each sub-block, a color value is computed at step 330. The color value is a value derived from the color features of one or more color bands of a synthetic image. In one embodiment, the color value is associated with the color histogram of the image. In another embodiment, the color value is associated with the color correlogram of the image. A color histogram is performed on the bands of each sub-block at step 330. Up to three histograms, one for each color band, may be computed for each sub-block. Thus, in addition to processing the texture features of the slides by computing the DCT in the frequency domain, the color features of the slides are also computed using a color histogram. After the color histogram is taken for all the sub-blocks of the images, the average color profile is determined at step 340. In one embodiment, the average color profile for a group of slides generated by averaging the value of the color histogram for each sub-block over all the slides of a group. After the average is determined, a value is derived for each sub-block at step 350. In one embodiment, the information content value is determined by taking a weighted average of the color value and the texture value. In one embodiment, as synthetic images are often generated with distinct colors, the color value element of the information content value may be weighted higher than the texture value. In one embodiment, the color value may be determined by taking the distance function between the average color profile and the actual color histogram value for each sub-block.

After an information content value has been determined for each sub-block in an image, operation of method 300 ends at step 335.

Grouping Sub-Blocks

After the sub-blocks have been determined and associated with an information content value, the sub-blocks may be grouped into regions of interest (ROI). One method for grouping sub-blocks is illustrated by method 400 in FIG. 4. Method 400 begins with start step 405. Next, the information content value is binarized for each sub-block at step 410. As discussed above, the information content values may be taken as the distance function between the average color profile and the color histogram value for each sub-block for each synthetic image. The information content values are binarized into values of either zero or one. In one embodiment, sub-blocks having a value above one standard deviation are set to one and the remainder of sub-blocks are set to zero. FIG. 5 illustrates an example image after being divided into sub-blocks and binarized. The sub-blocks that have been binarized to one are in black, the remainder are white. As illustrated, the sub-blocks binarized to one include block 511, 512, 521 and 522.

After the sub-blocks are binarized, they are grouped together at step 420. Grouping involves forming a "group" of neighboring sub-blocks that have an information content value within a predetermined range. In one embodiment, for each of the sub-blocks to be grouped, the area of that block times a predetermined threshold should not be less than the area of the intersection of the sub-blocks and the density of the combined sub-blocks should not exceed the average density of the plurality of sub-blocks. In one embodiment, the range for binarized sub-blocks is a value of one. A neighboring sub-block is one that shares a side or a corner. The process is continued until no further groupings can be made. In the illustration of FIG. 5, this method produced two groupings in image 500. The groups include a larger group outlined by border 513 and a smaller group outlined by border 523. To improve performance, standard morphology operations of dilation and erosion can be used in conjunction with the grouping. However, the grouping system of the present invention does not require these operations.

After sub-blocks have been grouped together, the dominant group is determined at step 430. In one embodiment, the dominant group is the group within the image having the largest bounding box area. The dominant group is then considered the ROI of the image. Selecting the bounding box as the ROI makes for simpler calculations than selecting a portion of the image corresponding to the actual binarized groups. Smaller bounding boxes usually contain random details, unlike a larger focus of an image that usually corresponds to the largest bounding box. After the dominant group is selected, operation of method 400 ends at step 435.

FIG. 6 illustrates a set of slides 600 for which ROIs have been determined using methods 300 and 400 of the present invention. As shown, each of the slides has an ROI that is highlighted with the remainder of the slide shaded in gray.

In one embodiment, it is possible that more than one "interesting" ROI occurs in an image. In some cases, the non-dominant may not correspond to anything particularly interesting. For applications that include non-dominant ROIs, one manner of resolving whether a non-dominant ROI should be selected is through user intervention. In this embodiment of the present invention, a user may be presented with multiple ROIs and remove the uninteresting ones. For the Stained-Glass collage, this means that all the ROIs would be shown initially, and the user can manually select and remove the bad ones. In other implementations, ROIs meeting a threshold, such as a minimum bounding box size, can be presented to a user for selection or removal.

Wavelet and other Spectral Decompositions

In addition to using a DCT decomposition as discussed above for determining a texture value, it is possible and within the scope of the present invention to use other spectral decompositions such as wavelet and Haar decompositions in other embodiment of the present invention. For example, wavelets provide a slightly better representation of the image at the cost of longer computation time. It also requires a more complicated algorithm. Thus, for example, for the JPEG 2000 standard which uses wavelet encoding (like DCT in the JPEG format), it is a viable alternative to use a wavelet decomposition to find the sub-blocks of high information content.

Stained Glass Image-Type Displays for Images

The ROI algorithm of the present invention can be used in Stained-Glass-type visualization as disclosed in U.S. patent application Ser. No. 10/815,354. The goal is to find ROIs in a set of synthetic images and condense them into a tightly packed layout. The stained-glass effect comes from non-rectangular region boundaries that emerge from a Voronoi-based algorithm for filling the spaces between the packed regions. For small displays on PDAs and cell phones, the result of the condensation of images is that the people, objects and graphics in these regions can be shown larger and become easier to see. For larger displays or printed posters, the Stained-Glass collage provides an aesthetically pleasing way to display images. As an example, a Stained-Glass collage 700 is shown in FIG. 7 that uses the ROIs from FIG. 6.

Several methods can be used to determine which slides from a set of slides shall be used to provide ROIs in a stained-glass type visualization, including uniform sub-sampling, ROI scoring from the average profile, and GSA algorithms. Uniform sub-sampling includes taking a sampling of the slides at some uniform interval, such as every third slide, or some other number. Picking slides based on the ROI scoring from the average profile involves taking the difference between the sub-blocks in an ROI and the sub-blocks in the average color profile, and adding the difference values to attain a score for each ROI. The ROIs with the highest scores are to be used in the stained-glass visualization. The GSA algorithm method may be a genetic segmentation algorithm that employs a segment fair crossover operation. A GSA algorithm of this type is disclosed in "A Genetic Segmentation Algorithm for Image Data Streams and Video", Chiu et al., Genetic and Evolutionary Computation Conference (GECCO), Las Vegas, Nev., Jul. 8, 2000, the content of which is incorporated herein by reference.

In one embodiment, the present invention includes an algorithm for finding regions of interest (ROI) in synthetic images based on an information driven approach in which sub-blocks of a set of synthetic image are analyzed for information content or compressibility based on textural and color features. In one embodiment, a DCT is used to analyze the textural features of a set of images and a color histogram is used to analyze the color features of the set of images. Sub-blocks of low compressibility are grouped into ROIs using a type of morphological technique. Unlike other algorithms that are geared for highly specific types of ROI (e.g. OCR text detection), the method of the present invention is generally applicable to arbitrary synthetic images. The present invention can be used with several other image applications, including Stained-Glass collages presentations.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, various embodiments of the present invention may be conveniently implemented using a conventional general purpose or a specialized digital computer(s) or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of general purpose or application specific integrated circuits and/or by interconnecting an appropriate network of conventional component circuits, as will be readily apparent to those skilled in the art.

Various embodiments of the present invention include a computer program product which is a storage medium (media) having instructions stored thereon/in which can be used to program a general purpose or specialized computing processor/device to perform any of the features and processes presented herein. The storage medium can include, but is not limited to, one or more of the following: any type of physical media including floppy disks, optical discs, DVD, CD-ROMs, microdrives, halographic storage, magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Various embodiments include a computer program product that can be transmitted over one or more public and/or private networks wherein the transmission includes instructions which can be used to program a computing device to perform any of the features presented herein.

Stored on any one or more of the computer readable medium (media), the present invention includes software for controlling both the hardware of general purpose/specialized computer(s) or processor(s), and for enabling the computer(s) or microprocessor(s) to interact with a human user or other mechanism utilizing the results of the present invention. Such software may include, but is not limited to, device drivers, operating systems, execution environments/containers, user interfaces and applications.

Included in the programming (software) of the general/specialized computer or microprocessor are software modules for implementing the teachings of the present invention, including, but not limited to, determining regions of interest in synthetic images.

A method for finding regions of interest in a synthetic image comprising computing a color value derived from the color features associated with a plurality of sub-blocks for a plurality of synthetic images. The color value computed on at least one of the color bands for each of the sub-blocks. Determining an information value associated with each of the plurality of sub-blocks and grouping the sub-blocks to form a region of interest.

The method for finding regions of interest in a synthetic image, wherein computing a color value associated with a plurality of sub-blocks includes computing a color histogram on three color bands for each of the sub-blocks in each of the synthetic images. The method for finding regions of interest in a synthetic image, wherein computing a color value includes computing a color correlogram on three color bands for each of the sub-blocks in each of the synthetic images.

The method for finding regions of interest in a synthetic image, further comprising computing a textural value using spectral decomposition on the plurality of sub-blocks for the plurality of synthetic images. The spectral decomposition being computed on at least one of the color bands for each of the plurality of sub-blocks and being one of a discrete cosine transform, a wavelet transform and a Haar decomposition. Computing a weighted-sum value by combining the color value with the textural value and determining the information value associated with each of the plurality of sub-blocks based on the weighted-sum value.

The method for finding regions of interest in a synthetic image, further comprising selecting a number of regions of interest from the plurality of synthetic images using uniform sub-sampling of the synthetic images. The method for finding regions of interest in a synthetic image, further comprising selecting a number of regions of interest from the plurality of synthetic images by determining the distance function between the color histogram for each of the regions of interest and the average color profile for the plurality of synthetic images. The method for finding regions of interest in a synthetic image, further comprising selecting a number of regions of interest from the plurality of synthetic images by using a genetic segmentation algorithm.

A method for finding regions of interest in a synthetic image having a plurality of sub-blocks that include color bands, comprising computing a color value derived from color features associated with the plurality of sub-blocks. The color value being computed on at least one of the color bands for each of the plurality of sub-blocks. Computing a textural value using spectral decomposition on the plurality of sub-blocks, the spectral decomposition being computed on at least one of the color bands for each of the plurality of sub-blocks and being one of a discrete cosine transform, a wavelet transform and a Haar decomposition. Computing a weighted-sum value by combining the color value with the textural value; and determining an information value associated with ach of the plurality of sub-blocks based on the weighted-sum value.

A machine readable medium having instructions stored thereon that when processed by one or more processors cause a system to compute a color value derived from the color features associated with a plurality of sub-blocks for a plurality of synthetic images. The color value computed on at least one of the color bands for each of the sub-blocks. Determine an information value associated with each of the plurality of sub-blocks and group the sub-blocks to form a region of interest.

The machine readable medium, wherein grouping the sub-blocks includes binarizing the information value for each sub-block of each synthetic image. The machine readable medium, wherein binarizing includes assigning a value of one to a sub-block with an information value above a standard deviation. The machine readable medium, wherein grouping the sub-blocks includes grouping neighboring sub-blocks together that have an information value that resides in a predetermined range. The machine readable medium, wherein the information value is a binarized value, and the predetermined range includes sub-blocks having an information value of one. The machine readable medium, wherein the grouped neighboring sub-blocks have an area that when multiplied by a predetermined threshold is not less than the area of the intersection of the blocks. The machine readable medium, wherein the grouped neighboring sub-blocks have a density that does not exceed the average density of the plurality of sub-blocks. The machine readable medium, wherein the instructions cause a system to determine a dominant group to be the largest group of sub-blocks. The machine readable medium, wherein the instructions allow a user to select one or more groups of blocks as regions of interest. The machine readable medium, wherein computing a color value associated with a plurality of sub-blocks includes computing a color histogram on three color bands for each of the sub-blocks in each of the synthetic images.

The machine readable medium, wherein computing a color value includes computing a color correlogram on three color bands for each of the sub-blocks in each of the synthetic images. The machine readable medium, wherein the instructions cause the system to compute a textural value using spectral decomposition on the plurality of sub-blocks for the plurality of synthetic images. The spectral decomposition being computed on at least one of the color bands for each of the plurality of sub-blocks and being one of a discrete cosine transform, a wavelet transform and a Haar decomposition. Compute a weighted-sum value by combining the color value with the textural value and determine an information value associated with each of the plurality of sub-blocks based on the weighted-sum value.

The machine readable medium, wherein the instructions further cause the system to select a number of regions of interest from the plurality of synthetic images using uniform sub-sampling of the synthetic images. The machine readable medium, wherein the instructions further cause the system to select a number of regions of interest from the plurality of synthetic images by determining the distance function between the color histogram for each of the regions of interest and the average color profile for the plurality of synthetic images. The machine readable medium, wherein the instructions further cause the system to select a number of regions of interest from the plurality of synthetic images by using a genetic segmentation algorithm.

What is claimed is:

1. A method for finding regions of interest in a synthetic image comprising:
   generating a plurality of sub-blocks for a plurality of synthetic images;
   computing a texture value derived from one or more color features associated with the plurality of sub-blocks, the texture value computed on at least one of one or more color bands for each of the sub-blocks, the texture value being computed using discrete cosine transform;
   computing a color value associated with the color value of each of the plurality of sub-blocks for one or more of the color bands, wherein the color value includes computing a color correlogram on one of one or more of the color bands for each of the sub-blocks in each of the synthetic images;
   determining an information value based on a weighted average of the texture value and the color value of each of the plurality of sub-blocks; and
   automatically grouping the sub-blocks based on the informational value to form a region of interest, wherein grouping includes grouping neighboring sub-blocks together that have an information value that resides in a predetermined range, wherein the grouped neighboring sub-blocks have a density that does not exceed an average density of the plurality of sub-blocks.

2. The method of claim 1 wherein grouping the sub-blocks includes:
   binarizing the information value for each sub-block of each synthetic image.

3. The method of claim 2 wherein binarizing includes assigning a value of one to a sub-block with an information value above a standard deviation.

4. The method of claim 1 wherein the information value is a binarized value, and the predetermined range includes sub-blocks having an information value of one.

5. The method of claim 1 wherein standard morphology operations of dilation and erosion can be used in conjunction with the grouping.

6. The method of claim 1 wherein determining a dominant group to be the largest group of sub-blocks.

7. The method of claim 1 wherein a user may supplement the automatic grouping and select one or more groups of sub-blocks as regions of interest.

8. The method of claim 1 further comprising:
   selecting a number of regions of interest from the plurality of synthetic images using uniform sub-sampling of the synthetic images.

9. The method of claim 1 further comprising:
   selecting a number of regions of interest from the plurality of synthetic images by using a genetic segmentation algorithm.

10. A non-transitory computer readable storage medium having instructions stored thereon that when processed by one or more processors cause a system to:
    generate a plurality of sub-blocks for a plurality of synthetic images, wherein the sub-blocks include two or more pixels;
    compute a texture value derived from one or more color features associated with the plurality of sub-blocks, the texture value computed on at least one of one or more color bands for each of the sub-blocks, the texture value being computed using an algorithm selected from the group consisting of a discrete cosine transform, a wavelet and a Haar decomposition;
    compute a color value associated with the color value of each of the plurality of sub-blocks for one or more of the color bands;
    determine an information value based on a weighted average of the texture value and the color value; and
    group the sub-blocks based on the informational value to form a region of interest, wherein the grouping includes grouping neighboring sub-blocks together that have an information value that resides in a predetermined range, wherein the grouped neighboring sub-blocks have a density that does not exceed an average density of the plurality of sub-blocks.

11. The computer readable storage medium of claim 10 wherein grouping the sub-blocks includes:
    binarizing the information value for each sub-block of each synthetic image.

12. The computer readable storage medium of claim 11 wherein binarizing includes assigning a value of one to a sub-block with an information value above a standard deviation.

13. The computer readable storage medium of claim 10 wherein the information value is a binarized value, and the predetermined range includes sub-blocks having an information value of one.

14. The computer readable storage medium of claim 10 wherein standard morphology operations of dilation and erosion can be used in conjunction with the grouping the neighboring sub-blocks.

15. The computer readable storage medium of claim 10 wherein the instructions cause a system to determine a dominant group to be the largest group of sub-blocks.

16. The computer readable storage medium of claim 10 wherein the instructions allow a user to select one or more groups of sub-blocks as regions of interest.

17. The computer readable storage medium of claim 10 wherein computing a color value associated with a plurality of sub-blocks includes:
    computing a color histogram on three color bands for each of the sub-blocks in each of the synthetic images.

18. The computer readable storage medium of claim 10 wherein computing a color value includes:
    computing a color correlogram on three color bands for each of the sub-blocks in each of the synthetic images.

19. The computer readable storage medium of claim 10 wherein the instructions cause the system to:
    compute a textural value using spectral decomposition on the plurality of sub-blocks for the plurality of synthetic images, the spectral decomposition being computed on three color bands for each of the plurality of sub-blocks;
    compute a weighted-sum value by combining the color value with the textural value; and
    determine an information value associated with each of the plurality of sub-blocks based on the weighted-sum value.

20. The computer readable storage medium of claim 10 wherein the instructions further cause the system to select a number of regions of interest from the plurality of synthetic images using uniform sub-sampling of the synthetic images.

21. The computer readable storage medium of claim 10 wherein the instructions further cause the system to select a number of regions of interest from the plurality of synthetic images by determining the distance function between the color histogram for each of the regions of interest and the average color profile for the plurality of synthetic images.

22. The computer readable storage medium of claim 10 wherein the instructions further cause the system to select a number of regions of interest from the plurality of synthetic images by using a genetic segmentation algorithm.

* * * * *